(12) United States Patent
Callau (10) Patent No.: US 9,009,305 B1
(45) Date of Patent: Apr. 14, 2015

(54) NETWORK HOST INFERENCE SYSTEM (75) Inventor: Carlos Vara Callau, Dublin (IE)

(73) Assignee: Amazon Technologies, Inc., Seattle, WA (US)

(*) Notice: Subject to any disclaimer, the term of this patent is extended or adjusted under 35 U.S.C. 154(b) by 204 days.

(21) Appl. No.: 13/593,398

(22) Filed: Aug. 23, 2012

(51) Int. Cl.
G06F 15/16 (2006.01)
H04L 29/06 (2006.01)

(52) U.S. Cl.
CPC .................................... *H04L 29/06* (2013.01)

(58) Field of Classification Search
CPC ...................................................... H04L 47/283
USPC ........................................................... 709/224
See application file for complete search history.

(56) References Cited

U.S. PATENT DOCUMENTS

| | | | |
|---|---|---|---|
| 7,453,804 B1* | 11/2008 | Feroz et al. ................... | 370/230 |
| 2002/0059408 A1* | 5/2002 | Pattabhiraman et al. ..... | 709/223 |
| 2002/0141341 A1* | 10/2002 | Haggar et al. ................. | 370/232 |
| 2004/0103193 A1* | 5/2004 | Pandya et al. ................. | 709/224 |
| 2004/0257994 A1* | 12/2004 | Paskett et al. ................. | 370/230 |
| 2006/0285500 A1* | 12/2006 | Booth et al. .................... | 370/250 |
| 2007/0070916 A1* | 3/2007 | Lehane et al. ................ | 370/252 |
| 2009/0279541 A1* | 11/2009 | Wong et al. .................... | 370/389 |
| 2010/0226390 A1* | 9/2010 | Yan et al. ....................... | 370/468 |
| 2011/0292792 A1* | 12/2011 | Zuo et al. ....................... | 370/230 |
| 2012/0075994 A1* | 3/2012 | Haggar et al. ................. | 370/235 |
| 2012/0290900 A1* | 11/2012 | Paniconi ........................ | 714/776 |
| 2012/0320789 A1* | 12/2012 | Wu et al. ........................ | 370/254 |
| 2013/0080657 A1* | 3/2013 | Yamaguchi et al. .......... | 709/234 |
| 2013/0275602 A1* | 10/2013 | Havekes et al. ............... | 709/226 |

* cited by examiner

Primary Examiner — Hamza Algibhah
(74) Attorney, Agent, or Firm — Knobbe, Martens, Olson & Bear, LLP (57) ABSTRACT A system and methods for monitoring and determining agent and network health, having a network monitoring and failure detection system that collects data reports and accumulates a set of data defined in terms of a time window. The network monitoring and failure detection system makes a determination of the agent health during the time window. The network monitoring and failure detection system then processes the collected data based on the determined health. The processing of the collected data can include disregarding the data, weighing the data, filtering the data, using the data in a feedback loop, or processing the data using another method or algorithm.

29 Claims, 5 Drawing Sheets

NETWORK HOST INFERENCE SYSTEM

BACKGROUND

Computer networks generally comprise various interconnected computing devices that can exchange data. Computing devices in a computer network can be in direct communication with one or more other computing devices. Each direct communication connection between computing devices in a computer network is generally referred to as a network link or link. While a computer network can be generally defined in terms of a number of computing devices and a number of links, typical computer networks do not include links between each computing device in a computer network. Rather, data to be exchanged between computing devices can be subdivided into packets and propagated via the computer network to eventually reach an intended recipient, regardless of whether there is a direct link between the sender and recipient.

More specifically, packets of data are typically transmitted from an originating computing device (e.g., a sending computing device) to an identified destination computing device. If a packet of data is received by a computing device in the computer network that is not the identified destination computing device, the receiving computing device becomes an intermediary in the communication path between the origin computing device and the destination computing device by forwarding the packet to another computing device in the computer network. Accordingly, each packet of data is transmitted through a series of intermediate links in the computer network until the packet reaches its destination computing device. The series of links for delivery of a packet of data between an origin computing device and a destination computing device is generally referred to as a network path or path.

Indications of total traffic on any one link in a network path may be obtained by measuring packets transmitted or received on the two computing devices directly connected by that link. However, as networks become increasingly complex, network operators may desire to obtain information regarding the performance of the network, rather than indications of total traffic on individual links. The performance of the network may include a view of the interconnection between all the computing devices in the network. Such a view is a closer approximation of what is experienced by a network user in terms of network performance. Performance of the network may include indications of dropped or lost packets, service degradation, or even of a network halt due to excessive traffic.

BRIEF DESCRIPTION OF DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

The present disclosure relates to systems and methods for monitoring and detecting agent and network health. In an illustrative embodiment, a network monitoring and failure detection system can have a plurality of agents running as guests on hosts and a data processing component. Illustratively, the agents may be hosted or executed on computing devices associated with one or more third parties. The agent, among other functions, can transmit and receive network probes. The data processing component receives periodic connections from the agents reporting network probing results. The processing component can aggregate and process the network probing results to evaluate network health. By distributing agents throughout the network, the network monitoring and failure detection system can receive network probing results from the entire network.

Generally described, agents can run on third party hosts and the proper function of each agent is influenced by the third party host processes. In some instances, third party processes on the hosts can perform actions that are detrimental to the proper function of the agent. For example, a third party host process can overload shared computing device resources, such as processors or memory, cause a host to reboot, kill other process including the agent process, or otherwise impair proper communication between the agent and the network monitoring and failure detection system. As such, it can be beneficial for the network monitoring and failure detection system to determine whether the data received from the agent is reflective of network performance and not reflective of issues related to the hosts.

Assessing the likelihood of whether the agent and host are functioning properly can be illustratively referred to as determining agent health. For example, when the network monitoring system determines that an agent is likely functioning properly, the agent is referred to as a "healthy" agent. When the network monitoring system determines that an agent is likely not functioning properly, the agent is referred to as a "sick" agent. One skilled in the relevant art will appreciate, however, the network monitoring system may not be able to determine with absolute certainty whether an agent or set of agents are indeed functioning properly. Accordingly, in some embodiments, the determination of agent health can be determined in terms of a determined likelihood whether an agent is "healthy" or "sick." The assessment of agent health can be based on one or more algorithms or processes having a plurality of inputs and constraints.

Illustratively, when an agent and host are likely functioning properly, the data provided to the network monitoring and failure detection system can help evaluate the network operating environment. Accordingly, the network monitoring system uses data from "healthy" agents to in turn analyze the health of the network. When an agent or a host is not functioning properly, the data that is provided by the agent may not be representative of the network operating environment, but rather, a host or agent that is not functioning properly. Accordingly, the network monitoring system may choose to remove the data from the "sick" agents or otherwise mitigate the influence of sick agent data from the analysis of the health of the network.

In one embodiment of a system for determining agent health, the network monitoring and failure detection system collects data reports and accumulates a set of data defined in terms of a time window. Then, the network monitoring and failure detection system makes a determination of the agent health during the time window. The network monitoring and failure detection system then processes the collected data based on the determined health. The processing of the collected data can include disregarding the data, weighing the data, filtering the data, using the data in a feedback loop, or processing the data using another method or algorithm.

The network monitoring and failure detection system uses data that is already available to the monitoring solution. This can help network monitoring systems to be more autonomous compared with systems that have to query external services to obtain host status information.

Although various aspects of the disclosure will be described with regard to illustrative examples and embodiments, one skilled in the art will appreciate that the disclosed embodiments and examples should not be construed as limiting.

Figure 1:
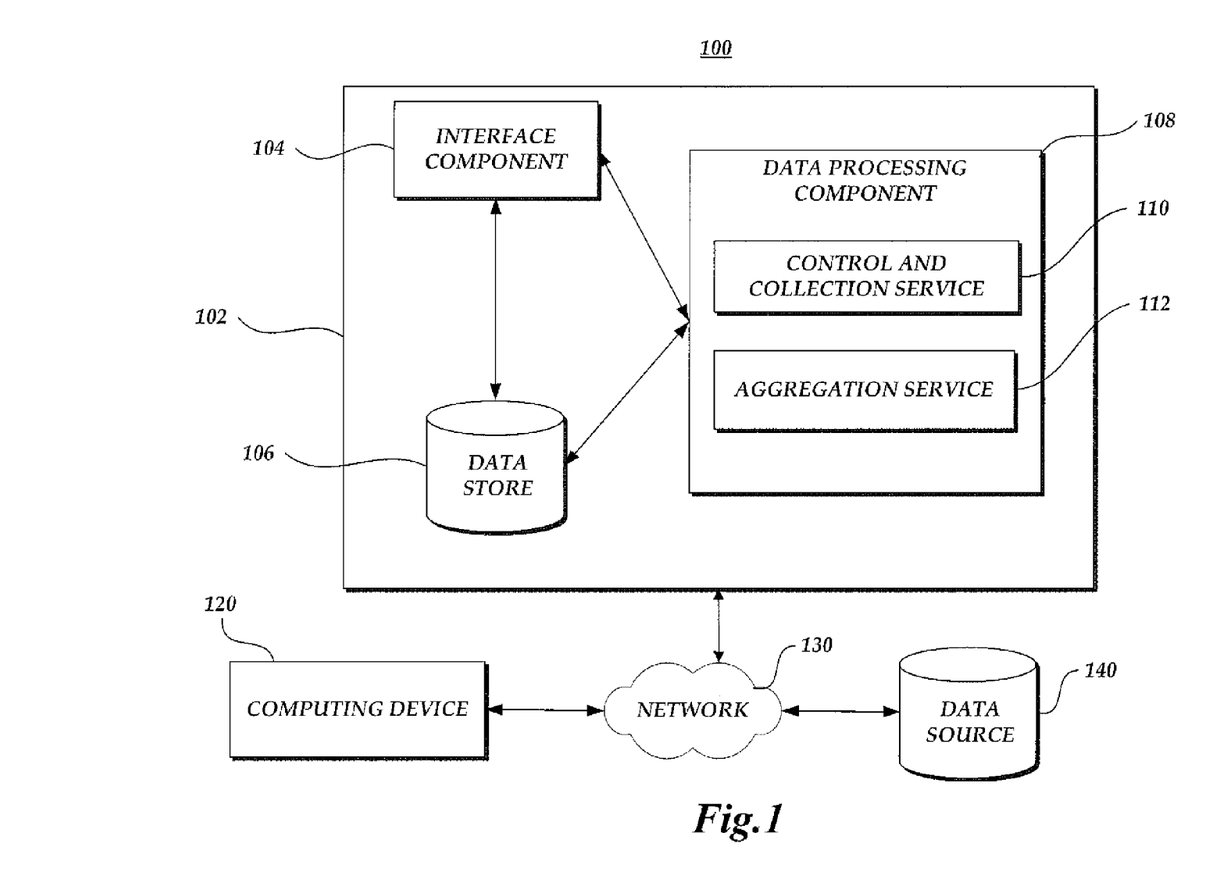
FIG. 1 is a block diagram depicting an illustrative embodiment of a computing environment implementing a network path monitoring and cause of failure detection system.

FIG. 1 is a block diagram depicting an illustrative embodiment of a computing environment 100 implementing a network monitoring and failure detection system 102. The network monitoring and failure detection system 102 includes a data store 106, an interface component 104 and a data processing component 108. The data processing component 108 includes a control and collection service 110, and an aggregation service 112. The depicted environment 100 also includes a client computing device 120 communicatively connected by a network 130, such as the Internet. Those skilled in the art will recognize that the client computing device 120 may be any of a number of computing devices that are capable of communicating over a network including, but not limited to, a data center server, workstation, laptop, personal computer, tablet computer, electronic book reader, personal digital assistant (PDA), hybrid PDA/mobile phone, mobile phone and the like. In some embodiments, the client computing device 120 may include computer hardware and software components. The computing environment 100 may also include one or several data sources 140 that may be external to the failure detection system 102. The computing environment 100 may also be collaborating with other network management systems in various data centers.

Figure 2A:
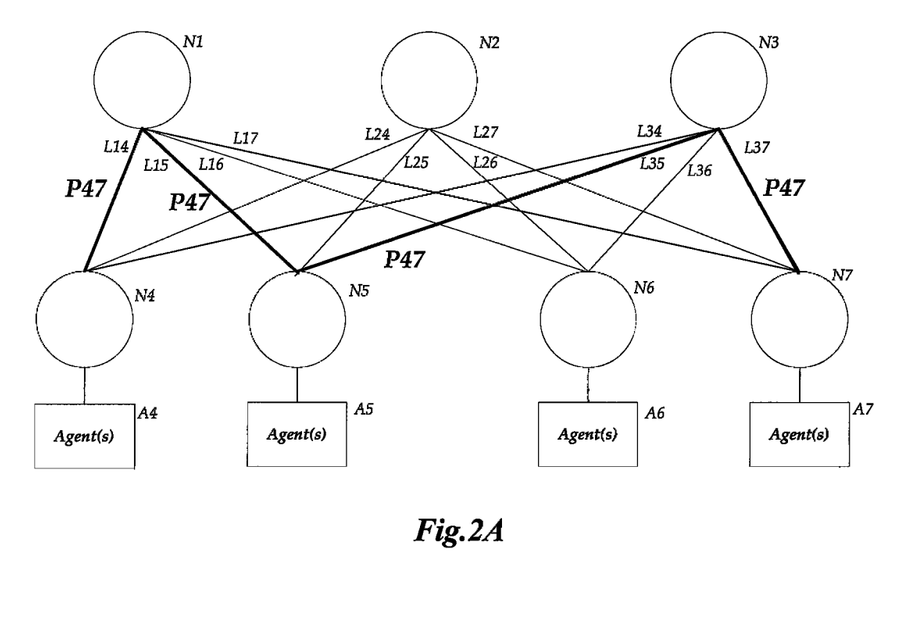
FIGS. 2A and 2B are schematic diagrams of an illustrative network topology defining various nodes, links and paths.

Illustratively, the network monitoring and failure detection system 102 may control and collect information from various nodes in network 130 through the control and collection service 110. The information can be collected from agents that communicate with the control and collection service 110. The network monitoring and failure detection system 102 may also aggregate the information collected through the aggregation service 112. In various embodiments, the information collected may include paths taken between nodes in the network, as well as performance indices along the various paths. The performance indices may include latency, dropped packets, bandwidth of links and the like. Using the information collected and aggregated, the data processing component 108 may determine the health of the agents. The data processing component 108 may also create a network topology which may be made available to be displayed on a client computing device 120 through the interface component 104. The data processing component 108 may also communicate with one or more external data sources 140. The data processing component 108 may also store information collected and aggregated into the data store 106 for later retrieval and use. The data processing component FIG. 2A is a schematic diagram of nodes, links and paths in an illustrative network. FIG. 2A illustrates nodes N1-N7, links L14-L17, L24-L27 and L34-L37 and path P47. As indicated, a direct connection between a pair of nodes consists of a link. The connection may include additional hardware components, but is considered direct for the purposes of this disclosure. Illustratively, nodes N1 and N4 are interconnected by link L14. Similarly, nodes N1 and N5 are interconnected by link L15. In accordance with FIG. 2A, communications of data involves sending individual packets of data from an origin node to a destination node. A packet sent from an origin node to a destination node which is more than one link away from the origin node follows a path consisting of several links. For illustrative purposes, a packet from node N4 to node N7 may follow a path P47. Path P47 includes links L14, L15, L35 and L37.

Illustratively, the origin node does not specify the path in which a packet may or must travel. Rather, if a receiving node is not the destination node (e.g., an intermediary node), the receiving node obtains a packet and transmits the packet to another node via a selected link. Accordingly, the results of each intermediary node forwarding a packet defines the path which the packet takes. As such, the same intermediary node may forward successive packets along different links, which would result in the successive packets being forwarded to the destination node along different paths based on the selection of the link the intermediary node. Another packet transmitted between node N4 and N7 may follow a different path.

One skilled in the relevant art will appreciate that networks monitored by the network monitoring and failure detection system 102 may include several more nodes than the illustrative network shown in FIG. 2A. The configuration of the paths, links and nodes within a network is generally referred to as the network topology.

FIG. 2A also illustrates agents A4-A7 associated with nodes N4-N7. Each of the nodes in the network may be associated with an agent. The agent may be on the same device as the node, or on a separate device. The agent can transmit information and data to the network monitoring and failure detection system 102. This information and data can include communication attributes, which can also be referred to as network health data. The communication attributes can be used to assess the health of the network.

The network monitoring and failure detection system 102 can select certain nodes in the network 130 to act as transmitters of messages to other nodes in the network 130 in order to test the reachability of those other nodes. The messages sent to the other nodes may consist of content-less messages. The agent associated with each of the nodes may be used to transmit the content-less messages, to respond to the messages sent from transmitters and to collect responses received.

In some embodiments, the transmitters may use User Datagram Protocol (UDP) packets to send the content-less messages. In other embodiments, Transmission Control Protocol (TCP), Internet Control Message Protocol (ICMP), Infiniband (IB), or other types of packets may be used. In some embodiments, including large complex networks, the network monitoring and failure detection system 102 does not require each node in the network to act as a transmitter of probes. The network may have a low number of such transmitters. Accordingly, the number of transmitters selected may be a percentage of the number of nodes. The selection may be made by balancing considerations of precision, performance and load on each transmitter or other statistical criteria. The network monitoring and failure detection system 102 can get full link coverage across all nodes in the network by using a low number of such transmitters. Selecting a larger number of transmitters allows the network monitoring and failure detection system 102 to compensate for faulty transmitters and for redundant links to the transmitters.

The network monitoring and failure detection system 102 can monitor network performance by allocating network probes across the network to achieve a desired coverage in order to adequately monitor network health. In one embodiment, the network probes can be allocated across a network by iterating through all the links in a network in order to meet a number of predetermined constraints. Examples of such constraints may include, for example, a minimum number of paths per link, or a maximum number of paths per link. Network data may be simulated by sending network probes from select agents in the network. Probes, such as UDP packets, are sent from selected agents in the network to all other nodes in the network. Probes can be used to measure communication attributes across the network.

The communication attributes can be measured on one-way or on round-trip paths. Communication attributes may include various measurements such as, for example, transit times of packets sent through the network. The time taken to send and receive the packet is recorded by the data control and collection service 110.

Figure 2B:
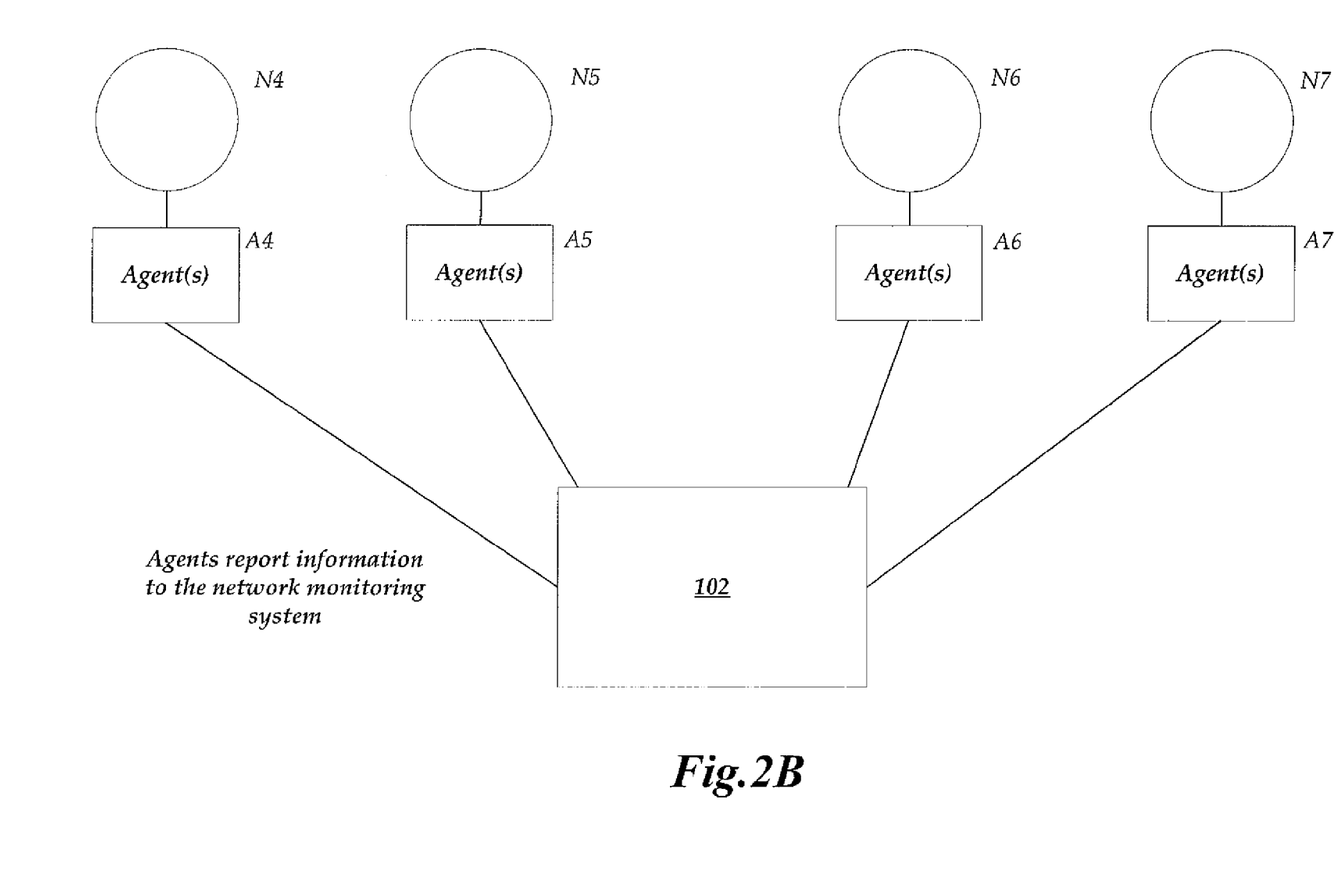

With reference to FIG. 2B the measured communication attributes are transmitted by the agents to the control and collection service 110, the aggregation service 112, the interface component 104 and/or the data store 106 of the network monitoring and failure detection system 102. The agents can communicate with the network monitoring and failure detection system 102 at periodic intervals. For example the, the agents could report to the network monitoring and failure detection system 102 every 100 milliseconds, or every 500 milliseconds, or every second, or every 5 seconds, or every 5 minutes, or other any other suitable period of time according system and/or other requirements.

In some embodiments agents report to the network monitoring and failure detection system 102 regardless of whether the information is requested by the control and collection service 110. In some embodiments the agents can be configured to report to the control and collection service 110 at irregular intervals, such as, for example, when there is network activity or when the control and collection service 110 requests that an agent report.

The communication attributes collected by the control and collection service 110 are received by the aggregation service 112. The communication attributes collected by each of the selected nodes are aggregated. Aggregation of the communication attributes helps enable detection of network failures. Data collected across several paths crossing the same node through different links and/or through packets sent from different transmitter nodes are aggregated. The communication attributes collected can be used to help determine whether there is adequate coverage of the network.

The aggregation service 112 can calculate performance characteristics of the nodes and links in the network using the aggregated communication attributes. Performance characteristics may include indications of packet loss, latency, throughput, jitter and the like. For example, the aggregation service can calculate an expected latency, which value can be represented by an integer, a statistical distribution aggregated from several sample measurements, or other representation. In some instances, packet loss may be determined to be a threshold value of latency. For example, latencies over 100 milliseconds may be considered to be packet losses.

The aggregation service 112 may store the information collected and aggregated in a data store such as data store 106 illustrated in FIG. 1. The aggregation service 112 may also create graphs to make available for display using the interface component 104 of FIG. 1. The graphs may display the performance characteristics in tabular format. The performance characteristics may also be displayed on the network topology representation. In some aspects, the performance and health characteristics may be overlaid on the network topology by the use of different colors, textures or other User Interface (UI) visualization elements for different link health or performance indications. The aggregation service 112 can perform network failure detection using the aggregated data and determine root cause of detected failures.

It may be desired to decrease the frequency of network probes to manage the load generated on network links. However, a minimum number of network probes are necessary for adequate coverage and monitoring of the network. In order to accurately measure packet drops on links to nodes, each node is tested for reachability at an ideal frequency designed to keep the amount of data generated by the transmission of the messages to a workable level while accurately measuring packet loss. In some embodiments, a network probe may be initiated every 100 milliseconds, or every 500 milliseconds, or every 5 seconds, or every 5 minutes, or any other suitable period of time according to business and/or other requirements of the network supported service.

Figure 3:
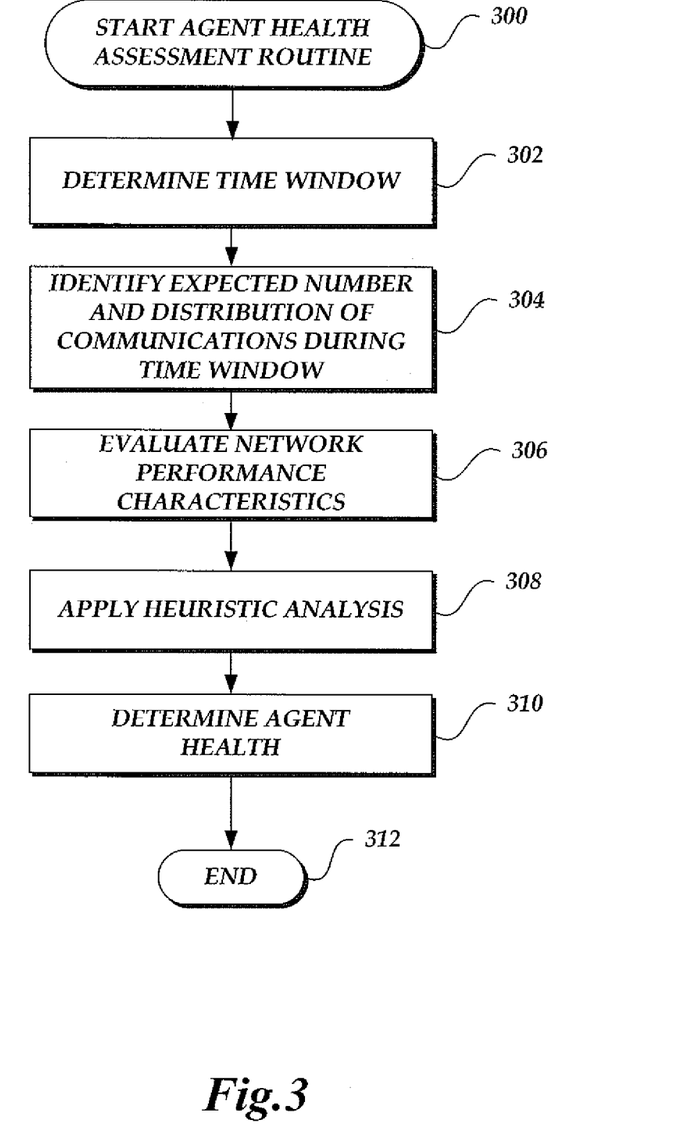
FIG. 3 is a flow diagram depicting an illustrative routine for determining agent health.

FIG. 3 is a flow diagram depicting an illustrative routine 300 for determining agent health in a network. One skilled in the relevant art will appreciate that actions/steps outlined for routine 300 may be implemented by one or many computing devices/components that are associated with the control and collection service 110 and the aggregation service 112 of the data processing component 108. Accordingly, the routine 300 has been logically associated as being generally performed by the control and collection service 110 and the aggregation service 112 of the data processing component 108, and thus the following illustrative embodiments would not be considered as limiting.

At block 302, the data processing component 108 determines a health assessment time window for receiving communications from an agent. During the time window the control and collection service 112 monitors the frequency of communications received from the agent. During the time window the agent communicates with the health monitoring and failure analysis system 102. Communications from agents can come at a specific frequency, such as every 100 milliseconds, every second, every 5 minutes, or another suitable period of time. A time window is configured where the control and collection service 110 is expecting to receive one or more communications from each agent. In some embodiments, a time window may be selected where the control and collection service 110 is expecting one, five, fifteen or more communications during the time window. For example, the time window can be 500 milliseconds, one second, 5 seconds, 10 seconds, 30 seconds, 5 minutes, or another suitable time. For frequent communications, the time window may be shorter, whereas with systems with infrequent communications, the time window may be longer.

Time windows can occur consecutively. In some embodiments the time windows can have a time buffer between each time window. In some embodiments all of the agents have the same time window. In other embodiments the time window for each agent can be configured individually. In some embodiments, the time window can include multiple parts. In one aspect, the time window can include a static time window component. In another aspect, the time window can include a flexible or dynamic time window. The flexible time window can be used evaluate communications from the agent before or after the static time window. The flexible time window helps evaluate the communications received during the static time window relative to communications received in the previous and subsequent time windows.

At block 304, the control and collection service 110 determines the number and expected distribution of communications that the control and collection service 110 expects to receive from the agent during the time window. The agents can be configured to send information to the control and collection service 110 at a regular frequency. In some embodiments, the agents communicate with the network monitoring and failure detection system 102 at irregular intervals or on an as-needed basis. The number and distribution of expected communications can vary dependent on various factors such as the duration of the time window, the type of agent, the frequency of communication, the number of agents, bandwidth, system design, network protocols and other factors. Both the distribution and number of communications are considered when assessing agent health. The distribution of communications during the time window can help determine whether the agent is communicating regularly with the control and collection service 110. In one embodiment the time window is 30 seconds and the control and collection service 110 expects to receive one communication every six seconds, about five communications per agent for each time window.

At block 306, the data processing component 108 can evaluate calculated network performance characteristics. The performance characteristic can influence the frequency and quality of communication between the agent and the control and collection service 110. The network performance characteristics can include latency, packet loss, jitter, available bandwidth, network protocols and the like.

The evaluation of network performance characteristics can be used to adjust the number and distribution of expected communications identified in block 304. The expected number of communications may indicate an optimal number of communications that the control and collection service 110 expects to receive. The expected number and distribution can be adjusted to take into account the operating environment of the network. For example, high network latency can reduce the number of communications that the control and collection service 110 will expect to receive. The operating environment can vary across a network and performance characteristics can be evaluated and applied on a per agent basis. In some embodiments the expected number and distribution of expected communications is adjusted for each agent individually.

In some embodiments the adjusted number of communications represents a communication threshold. The communication threshold can be a minimum number of communications that the data processing component 108 will accept for a healthy agent within a time window. In some embodiments the communication threshold can be the same as the expected number of communications identified at block 304. In some embodiments the communication threshold can be configured to be a static number that is calculated once. In other embodiments the threshold can be reevaluated at specific intervals based upon the existing performance characteristics. In another embodiment a feedback loop can be implemented to dynamically adjust the threshold based on changing network conditions.

At block 308, the data processing component 108 applies heuristic analysis to the information received from the agents. Heuristic analysis can be used to determine agent health in conjunction with other network information, such as information received from other agents, performance characteristics, network topology and the like. In one embodiment, the frequency and distribution of the incoming agent reports and the probe results can be used for an algorithm to determine agent health. The algorithm processes the frequency and probe results and accounts for several host and network failure scenarios to make a determination of the agent health. Heuristic analysis can help identify networking issues that can impair communications between an agent and the network monitoring system. When networking issues can be identified the agent can still be considered healthy and the networking issue can be appropriately analyzed by the network monitoring system.

Illustratively, the heuristic analysis can include an evaluation of various aspects of communications of an agent with other agents. The analysis can evaluate one or more communications that the agent receives from other agents. The agent to agent communication is used in addition to the agent to system communication to determine whether the agent is healthy. For example, if an agent is not communicating with the control and collection service 110 but is communicating with other agents, the agent to agent communication can be used to determine that the agent is likely healthy.

Another heuristic analysis can be based on the network topology. The hosts are arranged by racks. The agents can be grouped by the arrangement of hosts on the racks. After the determination of health for each agent, the racks can be grouped according to agent health. For example, racks can have all healthy agents, healthy and sick agents and all sick agents. For the racks with all sick agents, a threshold can be used to determine the likelihood that the rack is not communicating properly as opposed to problems associated with each agent on the rack. For example, if a rack has four or more agents and every agent is sick, it is more likely that communication to the rack is the problem and not because the agents are sick. If the threshold number of agents on a rack is satisfied and every agent is sick then the data processing component 108 can change the health determination for each affected agent from sick to healthy.

At block 310, the data processing component 108 determines the agent health. The data processing component 108 determines whether the agent the likelihood of whether the agent is functioning properly for each time window. An agent that is likely to be functioning properly is deemed healthy. An agent that is likely to not be functioning is properly is deemed sick. Agent communication with the network monitoring and failure detection system 102 can be impaired for a number of reasons such as rebooting the server, memory overload or other host processes that can inhibit the performance of the server and the network health data. Communication between the network monitoring system and an agent can also be impaired by a networking issue, in which case the agent can still be considered healthy. A networking issue can be identified and appropriately analyzed by the network monitoring system. The agent health information can be used to help evaluate the health of the network. The network monitoring and failure detection system 102 can provide a more robust analysis of the health of the network by determining the likelihood that the agents are communicating and/or functioning properly.

The evaluation of agent health during the time window can include evaluation of data received during the static time window and during a flexible time window. The flexible time window can extend before or after the time window and can be used to gather additional data that can help evaluate agent health. The duration of the flexible time window can change for each agent health determination. The flexible time window can help evaluate the communications received during the static time window relative to communications received in the previous and subsequent time windows.

In some embodiments, the agent health determination can occur after every time window. In other embodiments agent health can be determined less frequently. In some embodiments, the agent health determination can occur after a data gathering time period. The data gathering time period can extend in duration to encompass one or more time windows. If the agent health determination is made after the data gathering time period, the determination of agent health can be made for each time window within the time period. In some embodiments, the determination of agent health is not influenced by previous determinations of health.

In some embodiments, if the number of communications from an agent satisfies or exceeds the communication threshold, then the agent and the accompanying network health data is deemed healthy for the time window. If the number of communications does not satisfy the communication threshold then the agent and the accompanying network health data is deemed sick. Network health data from sick agents can pollute the network health analysis being performed by the network monitoring and failure detection system 102.

Figure 4:
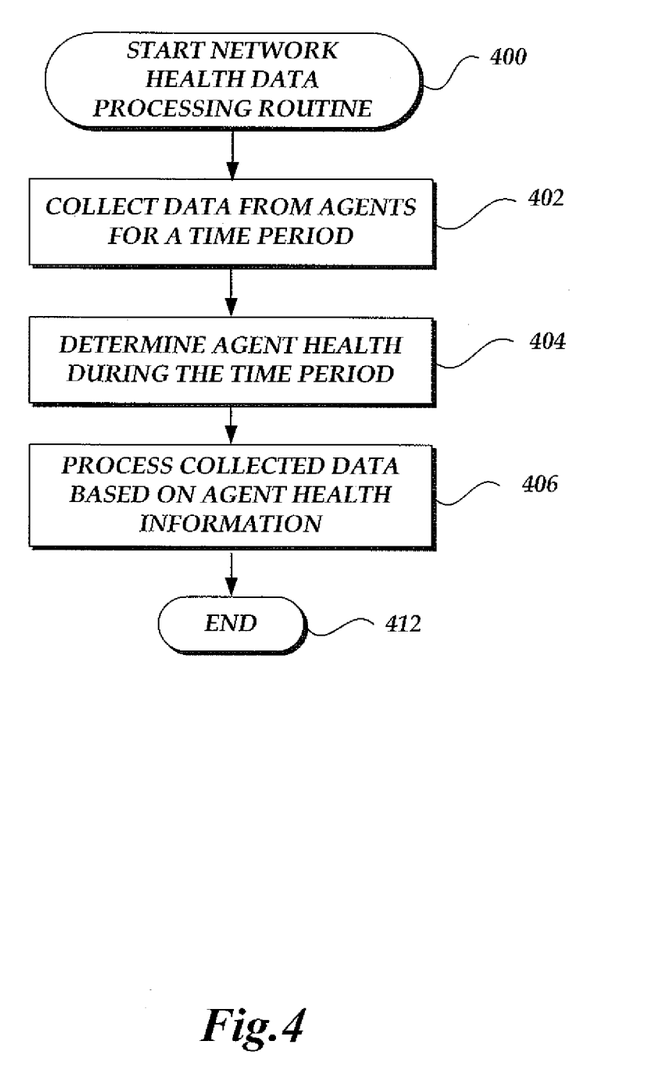
FIG. 4 is a flow diagram depicting an illustrative routine for processing network health data.

FIG. 4 is a flow diagram depicting an illustrative routine 400 for processing network health data based on agent health. One skilled in the relevant art will appreciate that actions/steps outlined for routine 400 may be implemented by one or many computing devices/components that are associated with the control and collection service 110 and the aggregation service 112 of the data processing component 108. Accordingly, the routine 400 has been logically associated as being generally performed by the control and collection service 110 and the aggregation service 112 of the data processing component 108, and thus the following illustrative embodiments would not be considered as limiting.

At block 402, the control and collection service 110 collects network health data from agents for a specified time period. The data gathering time period can have a different duration than a health assessment time window. The data gathering time period has the duration of at least a single health assessment time window. The data gathering time period can extend in duration to encompass a plurality of health assessment time windows. For example the health assessment time window can be 30 seconds and the data gathering time period can be 5 minutes, thus allowing 10 sets of health assessment time windows to occur within each data gathering time period.

The data gathering time period can be determined by the data processing component, a user, or according to system, business, or other requirements. The data gathering time period can be the same for all of the agents. In some embodiments, the system can have one or more data gathering time periods. For example one set of reporting agents can have a first data gathering time period, and a second set of reporting agents can have a second time period. The process for gathering and processing is the same regardless of the length of the time period. Multiple factors can be used to determine the data gathering time period, such as the length of the health assessment time window, the amount of data being processed, the frequency at which the network health needs to be assessed and updated, and/or according to system, business, or other requirements.

The health assessment time window can be determined, at least in part by the periodicity of communications of the agents to the control and collection service 110. Communications from the agents can come at a regular frequency, such as every 100 milliseconds, every second, every 5 seconds, every 5 minutes, or other acceptable or any suitable period of time. Preferably a time window is selected where the number of expected communications is greater than one. For example the time window may be selected where the control and collection service 110 is expecting 5, 10, or 15 communications during the time window. For frequent communications, the time window may be shorter, whereas with systems with infrequent communications, the time period may be longer.

The control and collection service 110 can collect data from all agents, groups or subsets of agents, or a sampling of agents throughout the network. The control and collection service 110 monitors communications received by each agent according to the time window. Data received during each health assessment time window is treated as a separate set of data for the purposes of evaluating the health of the agent. For example, over two time windows, the control and collection service 110 may receive six communications from an agent, five communications during the first time window and one communications during the second time window. In some embodiments, communications over the two time windows are not aggregated. Rather, each group of communications can be processed independently as a separate and distinct set of data for the purposes of evaluating health during the first time window and the second time window. In some embodiments the time window can include multiple parts. In one aspect, the time window can include a static time window component. In another aspect, the time window can include a flexible or dynamic time window. The flexible time window helps evaluate the communications received during the static time window relative to communications received in the previous and subsequent time windows.

The communications from the agents to the control and collection service 110 can include network health data. The network health data can include probe results that can be used to help assess the overall network health. For example the network health data can include information about latency, dropped packets, bandwidth, jitter and other information relating to network paths and nodes.

At block 404, the data processing component 108 determines the agent health during the each time window of the data gathering time period. The aggregation service 112 aggregates all of the data for each time period for processing of agent health data. The determination of agent health is processed for each agent individually and for each time window within the data gathering time period individually. The determination of health for one time window may not affect the determination of health for subsequent time windows. For each time window the system 102 makes an assessment of whether the agent is likely functioning properly. An agent that is determined to likely be functioning properly is deemed healthy. An agent that is determined to be not likely be functioning is properly is deemed sick. For example if the data for ten agents is being processed over a data gathering time period that contains ten time windows for each agent, the data processing component will determine agent health 100 times, once for each time period for each agent.

The determination of the agent health can be based on various factors, including the frequency of the communications from the agents to the control and collection service 110, and the network health data provided by the agent to the control and collection service 110. The data processing component 108 can calculate an expected number and distribution of communications that the control and collection service 110 is going to receive from the agent. All agents can have the same expected number and distribution of communications. In some embodiments, agents can have a different number and distribution of expected communications.

In some embodiments, the data processing component 108 may calculate an agent communication threshold. The communication threshold can be determined, in part, by calculating the expected latency and packet loss from the agent to the control and collection service 110. The communication threshold can be a minimum number of communications that the data processing component 108 will accept from a healthy agent. For example, the system can determine that the agent is likely not functioning properly if the number of communications does not satisfy or exceed the threshold. In some embodiments the threshold is used as a binary determination of agent health. In another embodiment, the threshold may be one of various thresholds that need to be satisfied to determine whether an agent is healthy. In other embodiments the number of communications from the agent may be an input for an algorithm that is used to determine agent health.

The network health information provided by the agent to the control and collection service 110 can also be used to evaluate the health of the agent. An algorithm may use the frequency of the agent communication and the agent probe results to determine the health of the agent. The algorithm may use heuristic analysis of the network based on network topology, latency, or other heuristics-type analysis.

After processing the agent health information, the data processing component 108 makes a determination of agent health for each time window for each agent. For example for an agent with ten time windows within a time period, the agent may be healthy for seven time windows and sick for three time windows.

At block 406, the aggregation service 112 processes the collected network health data based on the agent health. After the agents have been flagged as either likely healthy or likely sick, the agent health information can be used when processing the network health data. If an agent is sick it is likely that the network health data does not reliably reflect the health of the network. Using data from agents that are likely sick can pollute the network health data received from other agents. For agents that are likely sick, the data processing component 108 can disregard the data, the data can be weighted, the data can be filtered, the data can be used in a feedback loop, or other process determined by the system. Preferably there are a sufficient number of agents distributed about the network that disregarding or filtering out agent data from agents that are likely not functioning properly does not significantly impact the analysis of network health.

In some embodiments the determination of agent health can be an iterative process and the constraints governing the process used to assess agent health can change with each iteration. For example, in the first iteration the data processing component 108 can determine that too many agents were likely sick to perform a proper analysis of network health. The data processing component 108 can perform a second iteration of the same agent data with more relaxed constraints in order to identify additional healthy agents. With each iteration, the data processing component 108 can adjust the constraints in order to properly assess network health.

After the data has been processed according to agent health, the aggregation service 112 can processes the collected network health data for the data gathering time period. The network health data collected by the control and collection service 110 is used by the aggregation service 112 to determine network health. The network health data collected by each of the agents is aggregated. The aggregation service 112 can calculate performance characteristics of the nodes and links in the network using the aggregated network health data. Aggregation of the network health data helps enable detection of network failures and can be used to help determine whether there is adequate coverage of the network. By filtering out data from sick agents and unhealthy hosts, the system 102 can perform a more robust analysis of overall health of the network.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computing device for determining agent health comprising:
   a processing unit in communication with memory and an interface, the processing unit operative to:
      determine a time window for communications between a plurality of agents and an aggregator within a network;
      provide a communication threshold for the communication between the plurality of agents and the aggregator, wherein the communication threshold defines a number and a distribution of communications expected from individual agents of the plurality of agents to the aggregator during the time window;
      receive communications from the plurality of agents during the time window, wherein the communications include network health data associated with a plurality of nodes within the network;

determine whether the number and the distribution of communications from each of the agents to the network health monitoring system satisfies the communication threshold;

apply heuristic analysis based on the network health data and network performance characteristics associated with the communications;

determine a health status for individual agents, wherein the health status indicates the likelihood of whether the agent is functioning properly based at least in part on the heuristic analysis and the determination of whether the distribution satisfied the communication threshold;

determine network health data based on the determined health status of the individual agents.

2. The computing device of claim 1, wherein the agent health is determined for each of the plurality of agents.

3. The computing device of claim 1, wherein at least one of the network performance characteristics is latency.

4. The computing device of claim 1, wherein at least one of the network performance characteristics is packet loss.

5. The computing device of claim 1, wherein the processing unit is further configured to determine agent health for sequential time windows.

6. The computing device of claim 1, wherein the heuristic analysis is based, at least in part, on a network topology of the network.

7. A computer-implemented method for monitoring agent health, the method comprising:

determining a time window for a plurality of agents to communicate with a network health monitoring system;

identifying a number of expected communications from the plurality of agents to the network health monitoring system;

receiving communications from a plurality of agents during the time window, wherein the communications comprise network health data;

evaluating network performance characteristics based, at least in part, on the network health data received from the plurality of agents; and generating an assessment of agent health for individual agents of the plurality of agents during the time window based, at least in part, on the number of communications received from the agents and the network performance characteristics.

8. The computer implemented method of claim 7, further comprising determining a communication threshold defining a number of communications between individual agents of the plurality of agents and the health monitoring system.

9. The computer implemented method of claim 8, wherein the communication threshold is less than the number of expected communications.

10. The computer implemented method of claim 9, wherein in generating an assessment of agent health the agent is likely to not be functioning properly if the number of received communications is less than the communication threshold.

11. The computer implemented method of claim 7, wherein identifying a number of expected communications includes identifying an expected distribution of communications.

12. The computer implemented method of claim 7, wherein the time window has a static time window component and a flexible time window component.

13. The computing device of claim 7, wherein the time window is the same for the plurality of agents.

14. The computing device of claim 7, wherein the time window is different for at least two agents of the plurality of agents.

15. A computer-implemented method for processing data based on agent health, the method comprising:

collecting data from a plurality of agents for during a defined time period, wherein the data comprises performance characteristics associated with a plurality of network nodes;

analyzing the performance characteristics and frequency of the communications of the agents during the defined time period to make an assessment of agent health for the defined time period; and determining the operation of network nodes based on the assessment of agent health for the plurality of agents.

16. The computer implemented method of claim 15, wherein the assessment of health of each agent can be determined one or more times during the time period.

17. The computer implemented method of claim 15, wherein the assessment of agent health is a likelihood of whether the agent is functioning properly.

18. The computer implemented method of claim 15, wherein the assessment of agent health is a binary determination based on the likelihood of whether the agent is functioning properly.

19. The computer implemented method of claim 18, wherein processing the collected data based on the assessment of agent health includes discarding the collected data responsive to an assessment of agent health that the agent is not functioning.

20. The computer implemented method of claim 15, wherein the collected data is network health data.

21. The computer implemented method of claim 15, wherein the time period includes one or more time windows.

22. The computer implemented method of claim 21, wherein the assessment of agent health is determined for each of the one or more time windows.

23. The computer implemented method of claim 15, wherein determining an assessment of agent health during the time period includes determining a time window for a plurality of agents to communicate with the network health monitoring system.

24. The computer implemented method of claim 23, wherein determining an assessment of agent health during the time period includes identifying a number of expected communications from the plurality of agents with the network health monitoring system.

25. The computer implemented method of claim 24, wherein determining an assessment of agent health during the time period includes evaluating network performance characteristics with the network health monitoring system.

26. The computer implemented method of claim 25, wherein determining an assessment of agent health during the time period includes adjusting the number of expected communications based on the network performance characteristics with the network health monitoring system.

27. The computer implemented method of claim 15 wherein determining an assessment of agent health during the time period includes applying heuristic analysis based on communications between one or more of the plurality of agents.

28. The computer implemented method of claim 15 wherein determining an assessment of agent health during the time period includes applying heuristic analysis based on a network topology.

29. The computer implemented method of claim 15, wherein processing the collected data based on the assessment of agent health includes assigning the collected data a weight based on the determination of agent health.

\* \* \* \* \*

UNITED STATES PATENT AND TRADEMARK OFFICE
CERTIFICATE OF CORRECTION

PATENT NO.         : 9,009,305 B1
APPLICATION NO.    : 13/593398
DATED              : April 14, 2015
INVENTOR(S)        : Carlos Vara Callau Page 1 of 1

It is certified that error appears in the above-identified patent and that said Letters Patent is hereby corrected as shown below:

In the claims

In column 14 at line 6, In Claim 15, change "agents for" to --agents--.

Signed and Sealed this
First Day of March, 2016

Michelle K. Lee
*Director of the United States Patent and Trademark Office*